(12) United States Patent
Saitou

(10) Patent No.: US 10,811,917 B2
(45) Date of Patent: Oct. 20, 2020

(54) ROTOR OF ELECTRIC MOTOR

(71) Applicant: FANUC CORPORATION, Minamitsuru-gun, Yamanashi (JP)

(72) Inventor: Tetsumaru Saitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 126 days.

(21) Appl. No.: 16/046,393

(22) Filed: Jul. 26, 2018

(65) Prior Publication Data
US 2019/0036395 A1 Jan. 31, 2019

(30) Foreign Application Priority Data
Jul. 31, 2017 (JP) .................................. 2017-148505

(51) Int. Cl.
*H02K 1/22* (2006.01)
*H02K 7/00* (2006.01)
*H02K 17/16* (2006.01)
*H02K 15/00* (2006.01)
*H02K 3/04* (2006.01)

(52) U.S. Cl.
CPC ................ *H02K 1/22* (2013.01); *H02K 3/04* (2013.01); *H02K 7/003* (2013.01); *H02K 15/0081* (2013.01); *H02K 17/16* (2013.01)

(58) Field of Classification Search
CPC .. H02K 15/0081; H02K 17/165; H02K 7/003; H02K 1/22; H02K 1/28
USPC ....... 310/12.13, 49.38, 49.39, 112, 114, 118, 310/154.33, 156.09, 156.12, 156.22, 310/156.61, 402, 411, 211, 216.001, 310/216.004, 261.1, 405
See application file for complete search history.

(56) References Cited

U.S. PATENT DOCUMENTS

| 4,469,970 A * | 9/1984 | Neumann ............ H02K 1/2773 310/156.78 |
| 2003/0062786 A1 | 4/2003 | Reiter, Jr. et al. |
| 2010/0308685 A1 | 12/2010 | Hippen et al. |
| 2012/0137652 A1 | 6/2012 | Asprey et al. |
| 2019/0036395 A1 | 1/2019 | Saitou |

FOREIGN PATENT DOCUMENTS

| CN | 101553973 A | 10/2009 |
| CN | 208623411 U | 3/2019 |
| JP | H02097258 A | 4/1990 |
| JP | 06311711 A | 11/1994 |
| JP | 2003274621 A | 9/2003 |
| JP | 2005192397 A | 7/2005 |
| JP | 2005192398 A | 7/2005 |
| JP | 2006-230189 A1 | 8/2006 |
| JP | 2013070543 A | 4/2013 |
| JP | 2013240223 A | 11/2013 |
| KR | 20130056980 A | 5/2013 |

* cited by examiner

*Primary Examiner* — Nguyen Tran
(74) *Attorney, Agent, or Firm* — RatnerPrestia

(57) ABSTRACT

A rotor capable of improving a torque of an electric motor and a mechanical strength of the rotor. The rotor is provided with a shaft, a plurality of rotor segments that are lined up in the axial direction, and a connecting structure that connects a conductor of a first rotor segment and a conductor of a second rotor segment, which is adjacent to the first rotor segment in the axial direction, and that mechanically connects the first rotor segment and the second rotor segment with each other.

3 Claims, 15 Drawing Sheets

FIG. 13
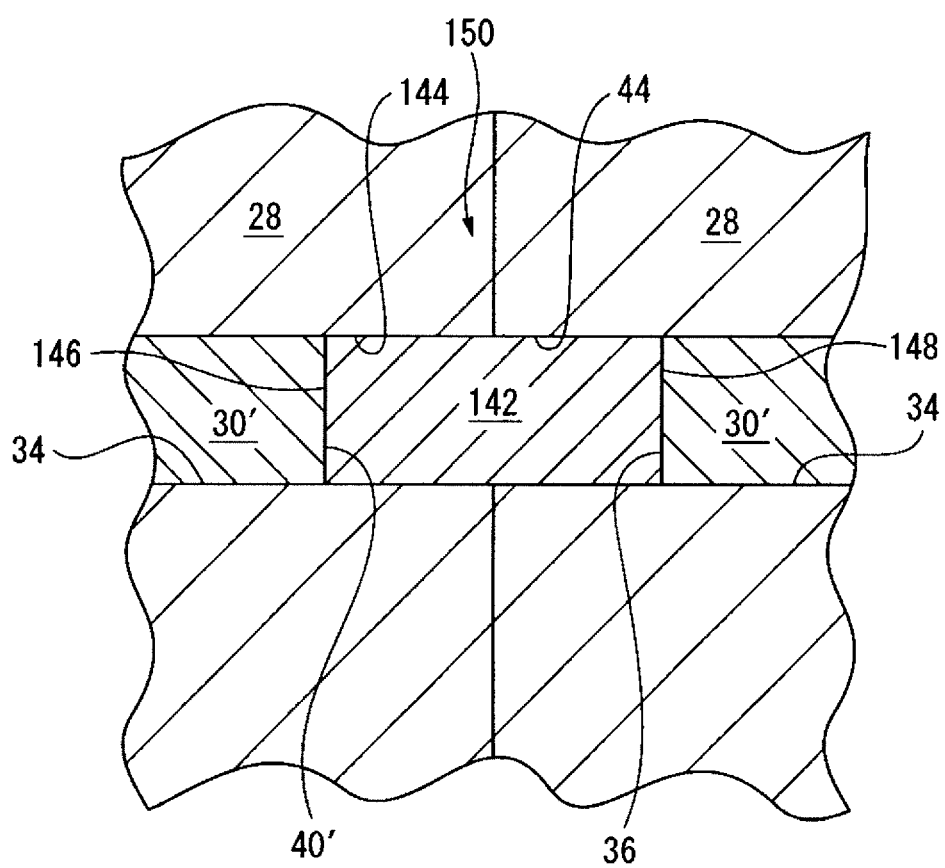
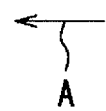

FIG. 16
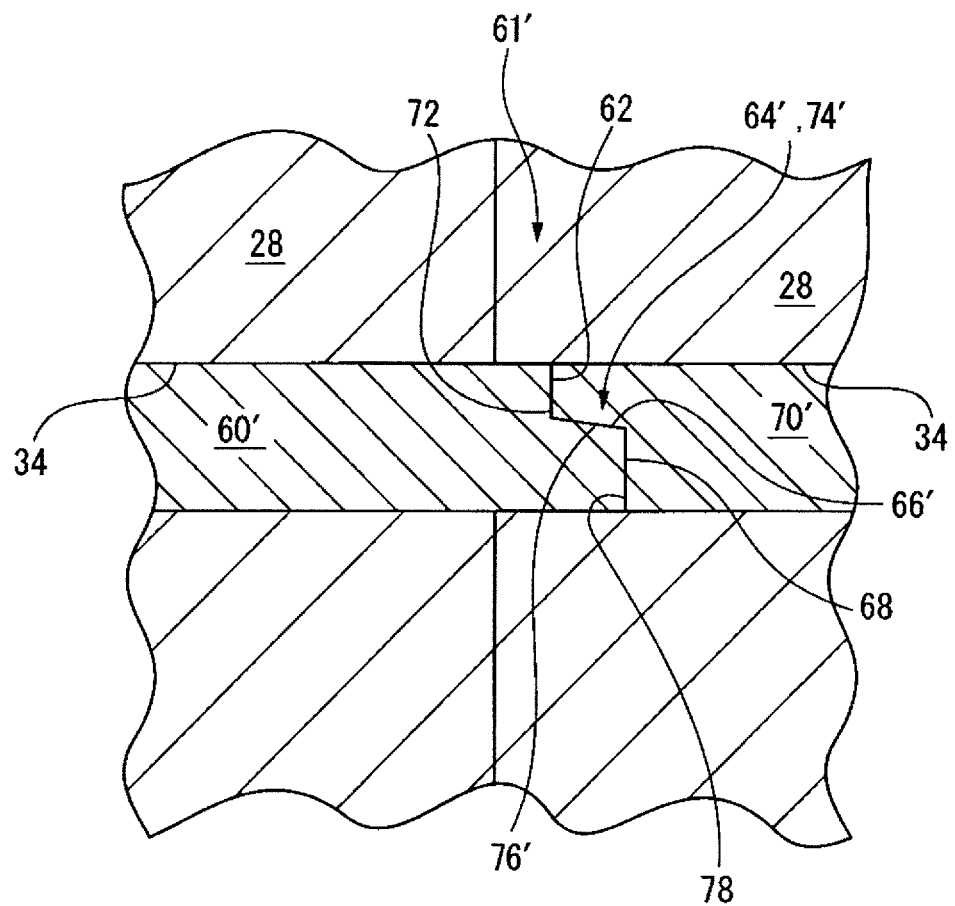
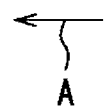

ROTOR OF ELECTRIC MOTOR

CROSS-REFERENCE TO RELATED APPLICATION

This application is a new U.S. Patent Application that claims benefit of Japanese Patent Application No. 2017-148505, filed Jul. 31, 2017, the disclosure of this application is being incorporated herein by reference in its entirety for all purposes.

BACKGROUND OF THE INVENTION

1. Field of the Invention

The invention relates to a rotor of an electric motor.

2. Description of the Related Art

In recent years, in order to respond to a demand for increasing an output of an electric motor, an electric motor has been developed in which an axial length of a rotor core is extended. A technology for such an electric motor is known in which the rotor core includes a plurality of segments lined up in the axial direction (e.g., JP 2006-230189 A).

In such an electric motor described above, there is a demand for an improvement in the torque of the electric motor and the mechanical strength of a rotor.

SUMMARY OF THE INVENTION

In an aspect of the present disclosure, a rotor of an electric motor includes a shaft extending in an axial direction; a plurality of rotor segments fixed radially outside of the shaft and aligning in the axial direction, each rotor segment including a core having a pair of axial end faces and a through-hole extending between the axial end faces, and a conductor disposed in the through-hole; and a connecting structure configured to connect the conductor of a first rotor segment with the conductor of a second rotor segment adjacent to the first rotor segment. A first axial end face of the core of the first rotor segment and a first axial end face of the core of the second rotor segment are in contact with each other. The connecting structure mechanically connects the first rotor segment and the second rotor segment with each other.

According to the present disclosure, an axial length of the conductors connected with each other in the axial direction can be increased, and an induced current generated in the conductors can thus be increased. As a result, a rotational torque of the rotor can be increased. At the same time, since the strength, in the radial direction, between two of the cores adjacent to each other in the axial direction can be strengthened, a relative displacement, in the radial direction, of the cores can be prevented.

BRIEF DESCRIPTION OF THE DRAWINGS

FIG. 13 is an enlarged cross-sectional view in which a connecting structure illustrated in FIG. 11 is enlarged.

FIG. 16 is an enlarged cross-sectional view of a connecting structure according to yet another embodiment.

DETAILED DESCRIPTION

Figure 1:
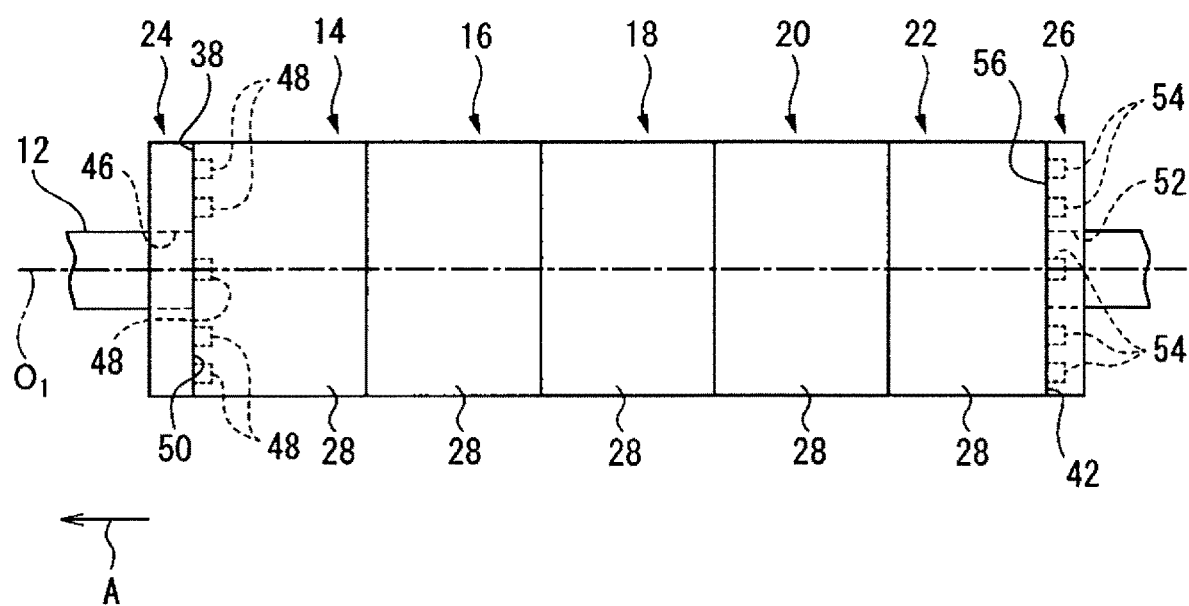
FIG. 1 is a side view of a rotor according to an embodiment.

Hereinafter, embodiments of the present disclosure will be described in detail with reference to the drawings. Note that, in the various embodiments to be described below, the same reference numerals will be given to similar components, and redundant explanations thereof will be omitted. Further, in the following explanation, "axial direction" indicates the direction along a rotational axis $O_1$ of a rotor, "radial direction" indicates the direction of a radius of a circle centered about the axis $O_1$, and "circumferential direction" indicates the direction of the circumference of the circle. Further, for the sake of convenience, the direction indicated by an arrow A in the drawings is referred to as the frontward direction in the axial direction (or axially frontward).

With reference to FIG. 1, a rotor 10 of an electric motor according to an embodiment is described. The rotor 10 can be applied as a rotor of an induction motor, and constitutes an electric motor (not illustrated) together with a stator (not illustrated).

The rotor 10 includes a shaft 12, a plurality of rotor segments 14, 16, 18, 20, and 22, and a pair of short-circuit rings 24 and 26. The shaft 12 is a column-shaped member extending in the axial direction. The plurality of rotor segments 14, 16, 18, 20, and 22 are fixed radially outside of the shaft 12, and align in the axial direction.

Next, with reference to FIG. 2 to FIG. 5, the rotor segments 14, 16, 18, 20, and 22 will be described. In this embodiment, the rotor segments 14, 16, 18, 20, and 22 have the same configuration.

Figure 3:
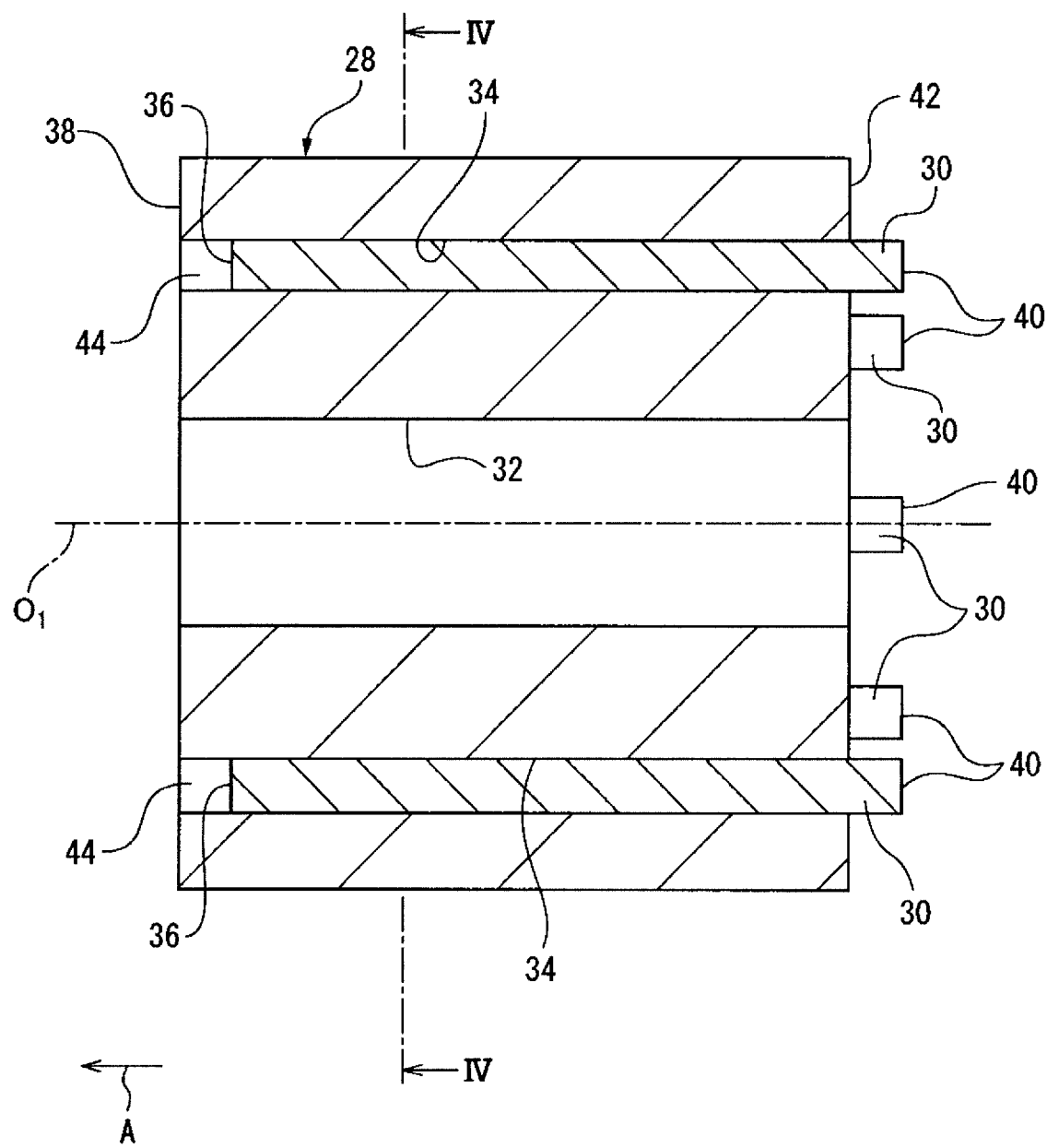
FIG. 3 is a cross-sectional view of a rotor segment illustrated in FIG. 1.
Figure 4:
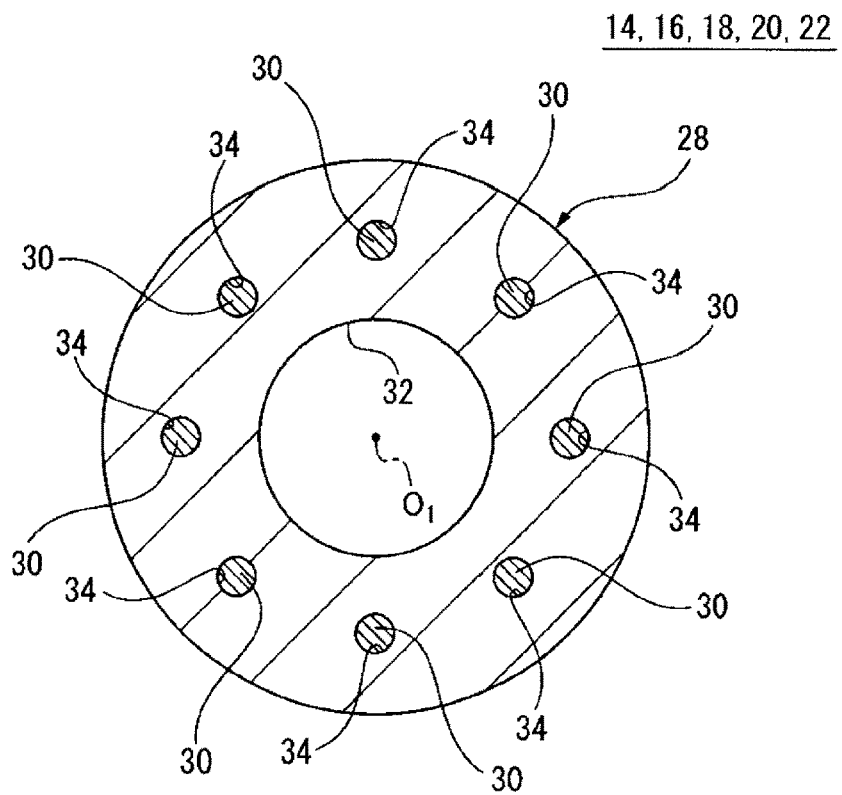
FIG. 4 is a cross-sectional view taken along a line IV-IV in FIG. 3.

As illustrated in FIG. 3 and FIG. 4, each of the rotor segments 14, 16, 18, 20, and 22 includes a cylindrical core 28 and a plurality of conductors 30. The core 28 is made of a plurality of magnetic steel sheets that are laminated in the axial direction, for example.

The core 28 includes a central hole 32, a plurality of through-holes 34, an axially front end face 38, and an axially rear end face 42. The central hole 32 penetrates the center of the core 28 in the axial direction. The shaft 12 is inserted into this central hole 32, and the core 28 is fixed on an outer circumferential surface of the shaft 12 by e.g. shrinkage fitting.

The through-holes 34 are substantially circular and disposed at radially outside of the central hole 32 so as to align in the circumferential direction at substantially equal intervals. The through-holes 34 extend from the end face 38 to the end face 42, and penetrate the core 28 in the axial direction. The conductors 30 are respectively disposed in the through-holes 34. The conductors 30 have a substantially circular cross-sectional shape, and are disposed in the through-holes 34 by e.g. die casting.

An axially front end 36 of each conductor 30 is disposed so as to be displaced axially rearward from the axially front end face 38 of the core 28. As a result, a space 44 is formed at an axially front end of the through-hole 34. On the other hand, an axially rear end 40 of each conductor 30 is disposed so as to protrude axially rearward from the axially rear end face 42 of the core 28.

In this way, in the rotor segments 14, 16, 18, 20, and 22, the conductors 30 are arranged in the through-holes 34 such that the axially front ends 36 thereof are disposed so as to be recessed inward of the core 28, and the axially rear ends 40 thereof are disposed so as to protrude outward of the core 28.

Figure 2:
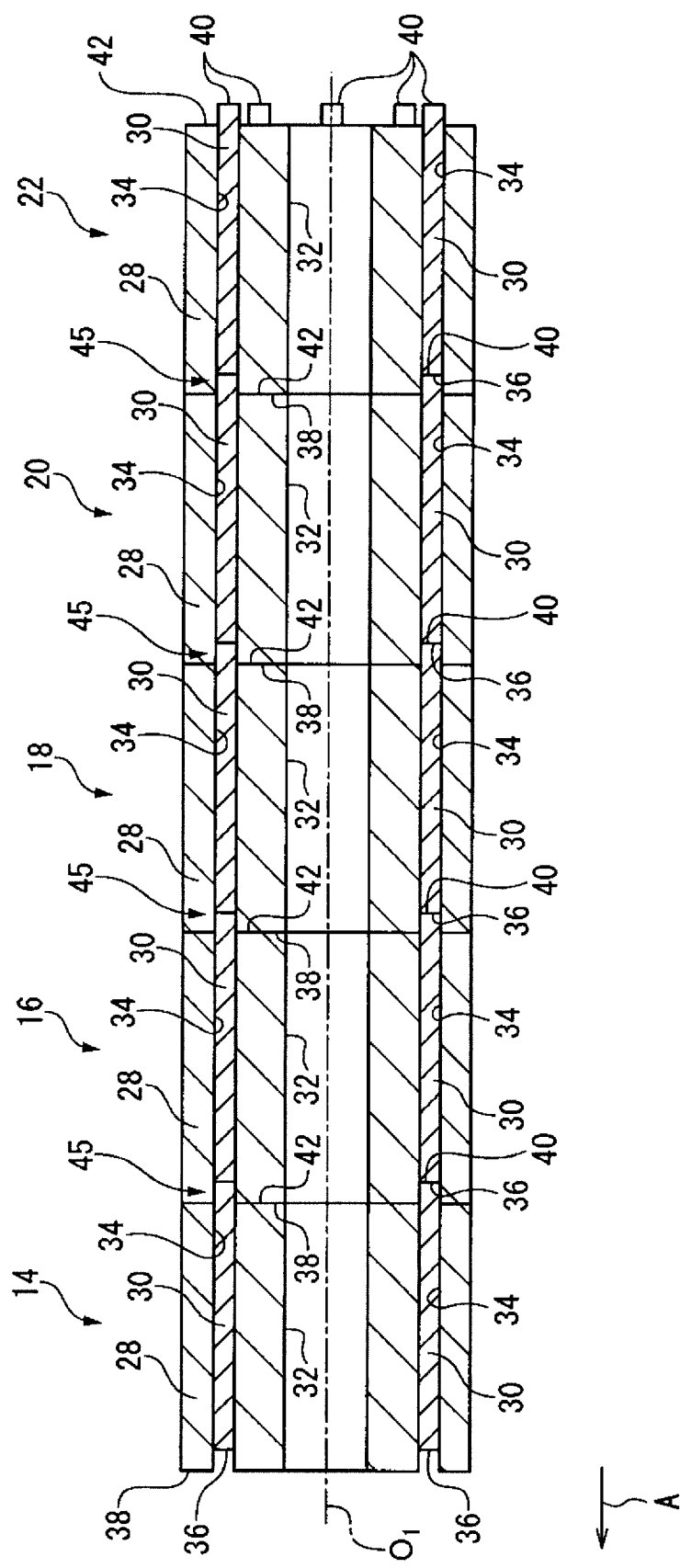
FIG. 2 is a cross-sectional view of the rotor illustrated in FIG. 1, and, for ease of understanding, a shaft and short-circuit rings are omitted.

When the rotor segments 14, 16, 18, 20, and 22 are disposed to align in the axial direction as illustrated in FIG. 1 and FIG. 2, two of the rotor segments 14 and 16, 16 and 18, 18 and 20, and 20 and 22, which are adjacent to each other in the axial direction, are in contact with each other.

Specifically, the axially rear end face 42 of one rotor segment (a first rotor segment) 14, 16, 18, or 20 is in surface-contact with the axially front end face 38 of the other rotor segment (a second rotor segment) 16, 18, 20, or 22, which is adjacent to the one rotor segment 14, 16, 18, or 20 on axially rear side.

The axially rear end 40 of the conductor 30 of the one rotor segment 14, 16, 18, or 20 is fitted into the space 44 formed in the through-hole 34 of the other rotor segment 16, 18, 20, or 22, and contacts the axially front end 36 of the conductor 30 of the other rotor segment 16, 18, 20, or 22. As a result, the conductors 30 of the rotor segments 14, 16, 18, 20, and 22 are connected in the axial direction so as to be conductive with each other.

In this way, in the rotor 10, by the axially rear end 40 of the conductor 30 protruding from the core 28 being fitted into the space 44, the conductor 30 of the one rotor segment 14, 16, 18, or 20 and the conductor 30 of the other rotor segment 16, 18, 20, or 22 adjacent to the one rotor segment 14, 16, 18, or 20 on axially rear side are connected with each other so as to be conductive with each other.

Therefore, a fitting structure between the axially rear end 40 of the conductor 30 and the space 44 constitutes a connecting structure 45 (FIG. 2) configured to connect two of the conductors adjacent with each other in the axial direction so as to be conductive with each other.

With reference to FIG. 1 again, the short-circuit rings 24 and 26 are disposed so as to sandwich the rotor segments 14, 16, 18, 20, and 22 from both sides in the axial direction. Specifically, the short-circuit ring 24 is a cylindrical conductor, and includes a central hole 46 and a plurality of protrusions 48. The central hole 46 penetrates the center of the short-circuit ring 24 in the axial direction, and receives the shaft 12. The short-circuit ring 24 is fixed on the outer circumferential surface of the shaft 12 by e.g. shrinkage fitting.

The plurality of protrusions 48 are formed so as to protrude axially rearward from an axially rear end face 50 of the short-circuit ring 24, and are respectively arranged at positions corresponding to the plurality of through-holes 34 provided in the rotor segment 14.

The short-circuit ring 24 is disposed adjacent to the core 28 of the rotor segment 14 on axially front side, such that the end face 50 of the short-circuit ring 24 is in surface-contact with the axially front end face 38 of the core 28 of the rotor segment 14. The protrusions 48 of the short-circuit ring 24 are respectively fitted into the spaces 44 of the through-holes 34 of the rotor segment 14, and conductively contact with the axially front ends 36 of the conductors 30 of the rotor segment 14.

The short-circuit ring 26 is a cylindrical conductor, and includes a central hole 52 and a plurality of conductor-receiving holes 54. The central hole 52 receives the shaft 12. The short-circuit ring 26 is fixed on the outer circumferential surface of the shaft 12 by e.g. shrinkage fitting.

The plurality of conductor-receiving holes 54 are formed so as to be recessed inward from an axially front end face 56 of the short-circuit ring 26, and are respectively arranged at positions corresponding to the plurality of through-holes 34 provided in the rotor segment 22 so as to be in communication with the through-holes 34.

The short-circuit ring 26 is disposed adjacent to the core 28 of the rotor segment 22 on axially rear side, such that the end face 56 of the short-circuit ring 26 is in surface-contact with the axially rear end face 42 of the core 28 of the rotor segment 22. The axially rear ends 40 of the conductors 30 of the rotor segment 22 are respectively received in the conductor-receiving holes 54 of the short-circuit ring 26, and conductively contact the short-circuit ring 26.

In this way, the conductors 30, and the short-circuit rings 24 and 26 become conductive with each another, thereby constituting a cage-type conductor, wherein an induced current is generated in the conductors 30 by a rotating magnetic field formed by the stator (not illustrated) so as to generate a rotation torque about the axis O. As a result, the rotor 10 rotates about the axis O.

As described above, in this embodiment, by the connecting structure 45, the axially rear ends 40 of the conductors 30 of the one rotor segment 14, 16, 18, or 20 are fitted into the spaces 44 of the through-holes 34 of the other rotor segment 16, 18, 20, or 22 adjacent to the one rotor segment on axially rear side, as a result of which, the one rotor segment 14, 16, 18, or 20 is mechanically connected to the other rotor segment 16, 18, 20, or 22 via the conductors 30.

Then, each conductor of the one rotor segment engages a wall surface that defines each through-hole 34 of the other rotor segment. According to this configuration, since the strength in the radial direction between the core 28 of the one rotor segment and the core 28 of the other rotor segment can be enhanced, it is possible to prevent these two cores 28 from being displaced in the radial direction relative to each other.

Further, in this embodiment, the rotor segments 14, 16, 18, 20, and 22 are aligned in the axial direction such that two of the adjacent cores 28 are in surface-contact with each other, and no short-circuit ring is interposed between the two adjacent cores 28.

According to this configuration, an axial length of the conductor 30, which contributes to the generation of the rotation torque, can be increased, thereby the induced current generated in the conductors 30 can be increased. As a result, it is possible to increase the rotational torque of the rotor 10.

It should be noted that there are many variations of the connecting structure 45 that connects two conductors 30. Variations of the connecting structure are described below with reference to FIG. 5 to FIG. 8.

Figure 5:
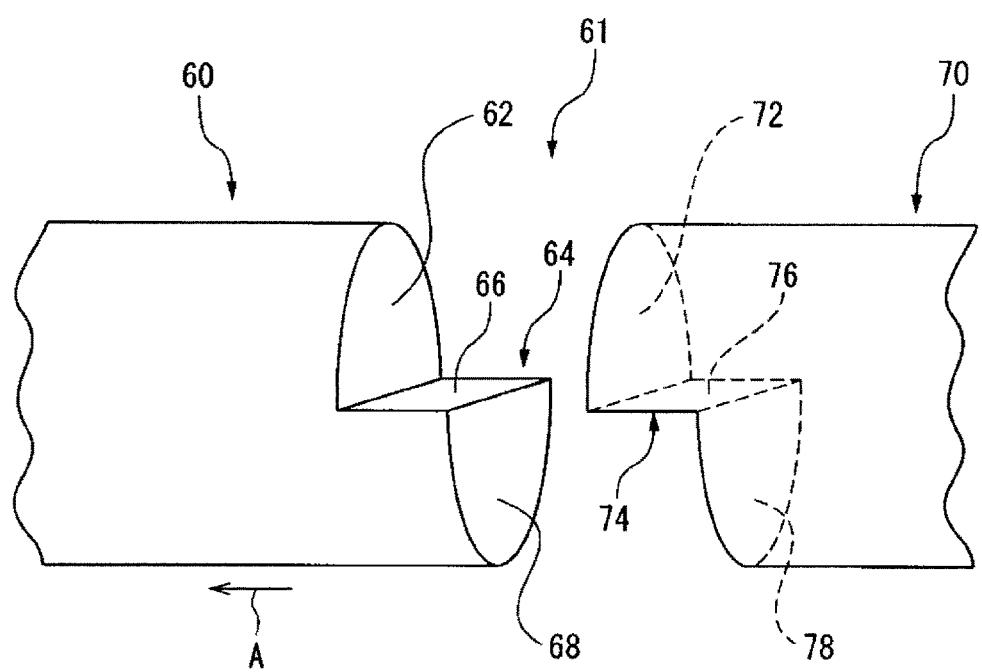
FIG. 5 is an exploded perspective view of a connecting structure according to another embodiment.
Figure 6:
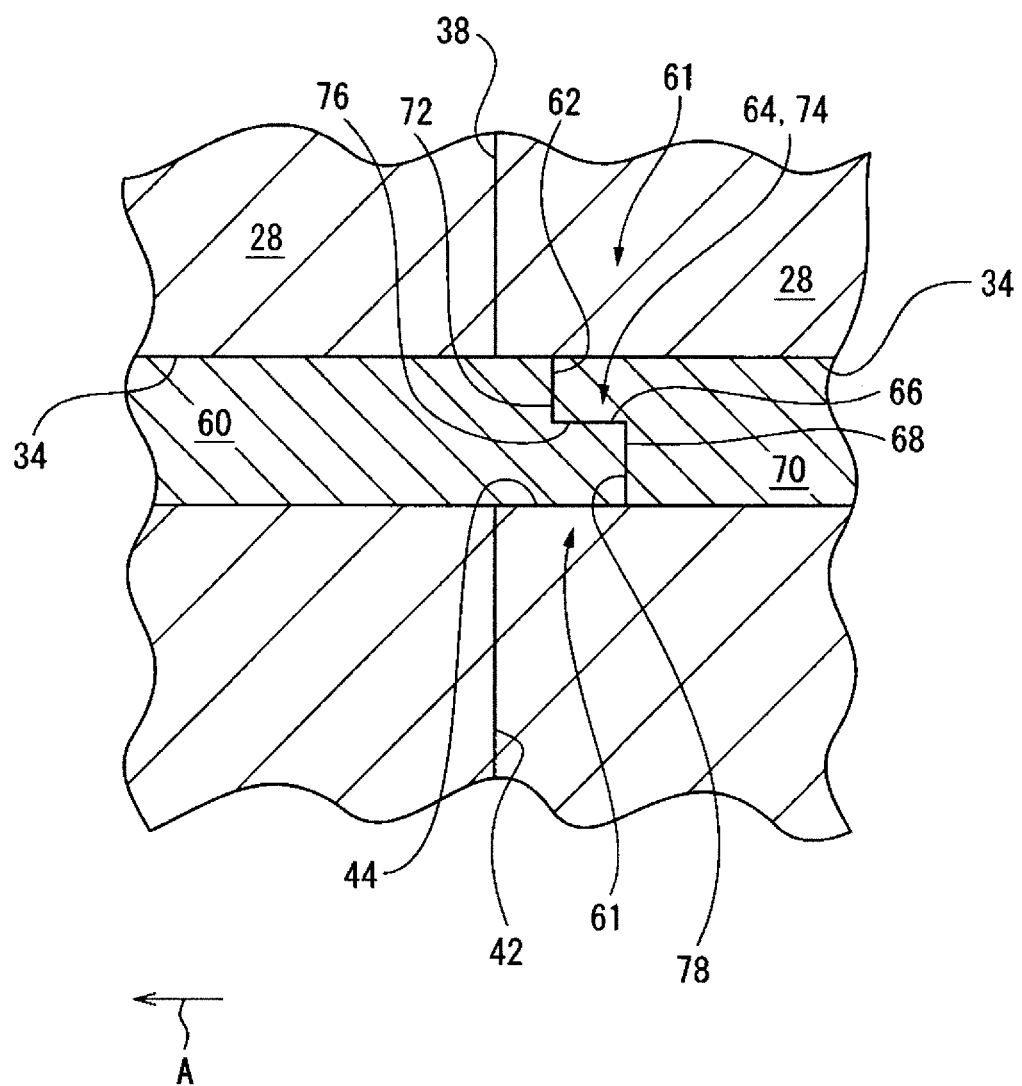
FIG. 6 is a cross-sectional view illustrating a state in which two conductors are connected using the connecting structure illustrated in FIG. 5.

FIG. 5 and FIG. 6 illustrate a connecting structure 61 configured to connects a conductor 60 with a conductor 70 arranged axially rear side of the conductor 60. The conductors 60 and 70, and the connecting structure 61 can be applied to the above-described rotor 10.

As illustrated in FIG. 6, the conductor 60 is disposed in the through-hole 34 such that an axially rear end of the conductor 60 protrudes axially rearward from the axially rear end face 42 of the core 28. On the other hand, the conductor 70 is disposed in the through-hole 34 such that an axially front end of the conductor 70 is recessed axially rearward from the axially front end face 38 of the core 28.

A protrusion 64 is formed at the axially rear end of the conductor 60 so as to protrude axially rearward from an end face 62. The protrusion 64 is defined by a side surface 66 extending to be parallel with the axial direction, and an end face 68 connected to an axially rear edge of the side surface 66. The side surface 66 is a flat surface facing to a direction orthogonal to the axial direction. The end faces 62 and 68 are flat surfaces substantially orthogonal to the axial direction.

On the other hand, the conductor 70 is formed with a recess 74 recessed axially rearward from an axially front end face 72. The recess 74 is defined by a side surface 76 and an end face 78 connected to an axially rear edge of the side surface 76. The side surface 76 is a flat surface parallel with the side surface 66 of the protrusion 64. The end faces 72 and 78 are flat surfaces parallel with the end faces 62 and 68 of the conductor 60, respectively.

As illustrated in FIG. 6, when the conductor 60 and conductor 70 are connected with each other, the axially rear end of the conductor 60 is fitted into the space 44 of the through-hole 34 located axially rear side of the conductor 60, and the protrusion 64 is fitted into the recess 74. At this time, the end face 62 and the end face 72, the side surface 66 and the side surface 76, and the end face 68 and the end face 78 come into surface-contact with each other. As a result, the conductors 60 and 70 are connected in the axial direction so as to be conductive with each other.

In this way, in this embodiment, by the axially rear end of the conductor 60 being fitted into the space 44, and by the protrusion 64 being fitted into the recess 74, the conductor 60 and the conductor 70 are connected with each other so as to be conductive with each other. Therefore, a fitting structure between the axially rear end of the conductor 60 and the space 44 and a fitting structure between the protrusion 64 and the recess 74 constitute the connecting structure 61.

Then, the connecting structure 61 includes the side surface 66 and the end face 68 that define the protrusion 64, and the side surface 76 and the end face 78 that define the recess 74. By this connecting structure 61, two of the rotor segments adjacent to each other in the axial direction are mechanically connected via the conductors 60 and 70.

According to this embodiment, by the conductor 60 engaging the wall surface that defines the through-hole 34 of the core 28 located axially rear side of the conductor 60, the strength in the radial direction between two of the cores 28 adjacent to each other in the axial direction can be enhanced, and therefore, it is possible to prevent these cores 28 from being displaced in the radial direction relative to each other.

In addition, in this embodiment, the side surfaces 66 and 76 extending in the axial direction are in contact with each other. As a result, a disconnection between the conductor 60 and the conductor 70 can be prevented during an operation of the rotor 10. This function is described below.

During the operation of the rotor 10, due to an effect of heat generated in the rotor 10, two of the cores 28 adjacent to each other in the axial direction may be displaced so as to be separated from each other in the axial direction. When two of the cores 28 are separated from each other in this way, the conductor 60 and the conductor 70 may be also displaced so as to be separated from each other in the axial direction.

In this embodiment, the side surface 66 and the side surface 76 extending in the axial direction are in contact with each other. Due to this, even when the conductor 60 and the conductor 70 are slightly separated from each other in the axial direction, the side surface 66 and the side surface 76 slide relative to each other in the axial direction while contacting with each other. Thus, since the conductive contact between the conductor 60 and the conductor 70 can be maintained, it is possible to prevent the disconnection between the conductor 60 and the conductor 70.

Further, in this embodiment, in addition to the surface-contact between the side surfaces 66 and 76, the end face 62 and the end face 72, and the end face 68 and the end face 78 are also in surface-contact with each other. According to this configuration, since an electric resistance between the conductor 60 and the conductor 70 can be decreased, thereby a larger induced current is generated therein, it is possible to generate a larger rotational torque.

Figure 7:
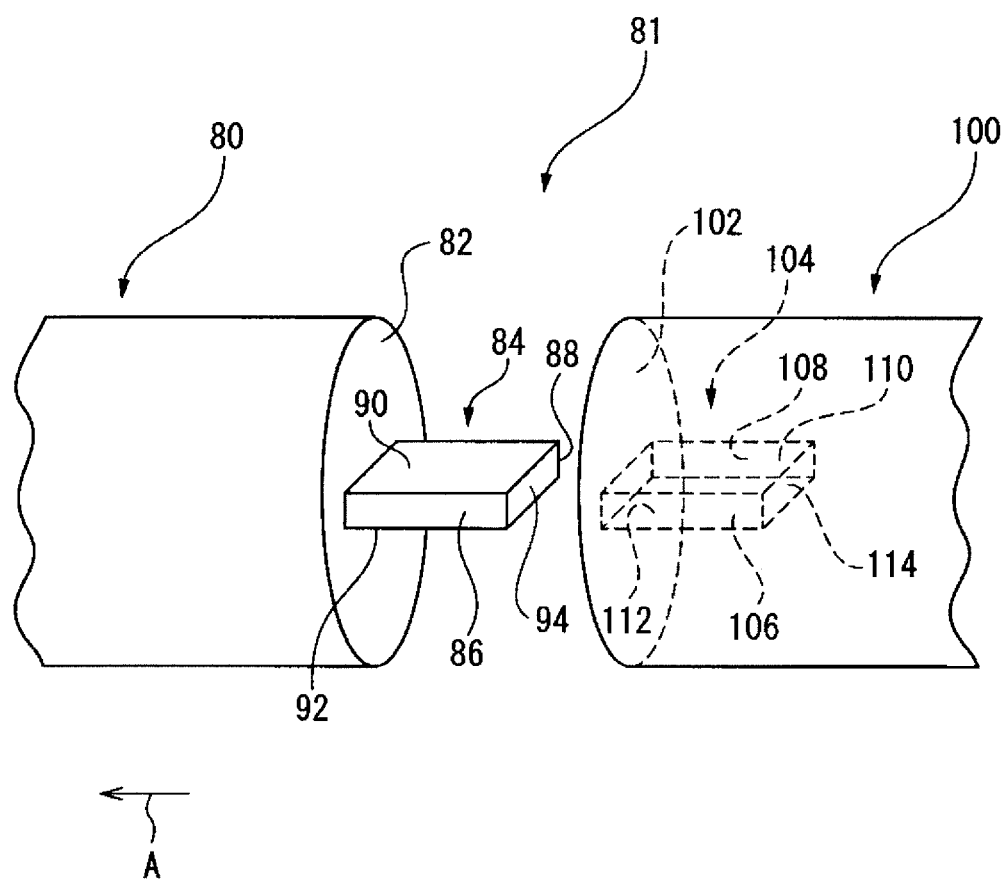
FIG. 7 is an exploded perspective view of a connecting structure according to yet another embodiment.
Figure 8:
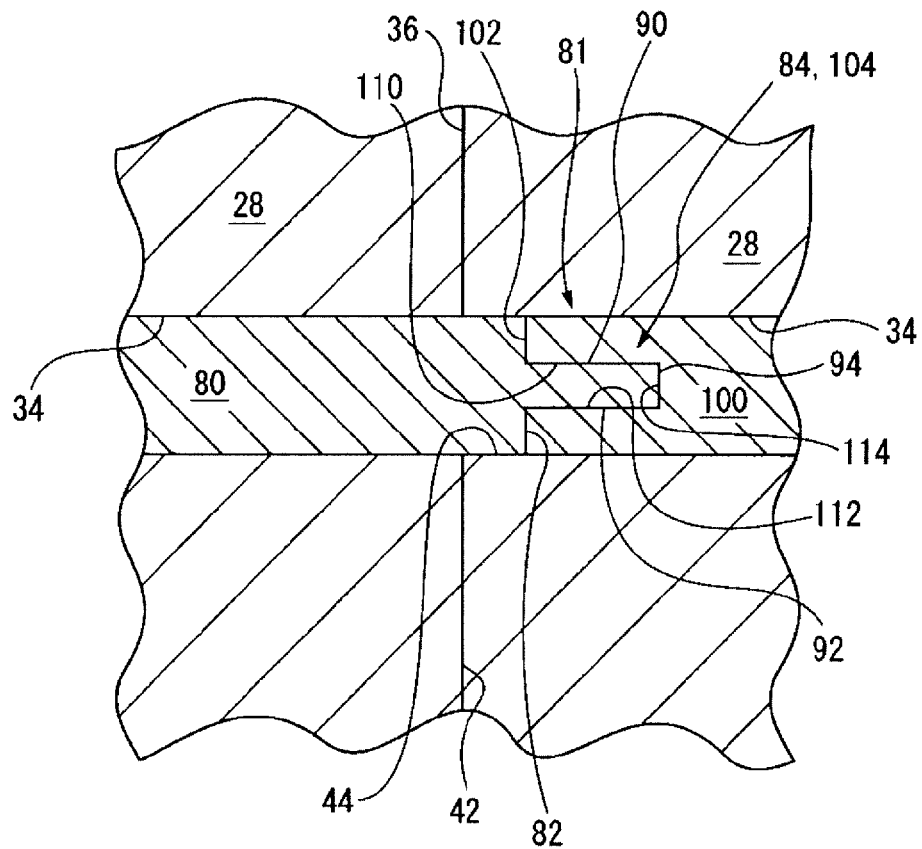
FIG. 8 is a cross-sectional view illustrating a state in which two conductors are connected using the connecting structure illustrated in FIG. 7.

FIG. 7 and FIG. 8 illustrate a connecting structure 81 between a conductor 80 and a conductor 100 that is disposed axially rear side of the conductor 80. The conductors 80 and 100, and the connecting structure 81 can be applied to the above-described rotor 10.

At an axially rear end of the conductor 80, a protrusion 84 is formed so as to protrude axially rearward from an end face 82. The protrusion 84 has a square column shape, and is defined by side surfaces 86, 88, 90 and 92, and an end face 94.

The side surfaces 86 and 88 extend axially rearward from the end face 82 in parallel with the axial direction so as to be opposite to each other. The side surfaces 90 and 92 extend between the side surfaces 86 and 88, and extend axially rearward from the end face 82 in parallel with the axial direction so as to be opposite to each other.

Each of the side surfaces 86, 88, 90, and 92 is a flat surface facing to the direction orthogonal to the axial direction. The end face 94 is connected to axially rear edges of the side surfaces 86, 88, 90 and 92, and is a flat surface substantially orthogonal to the axial direction.

On the other hand, the conductor 100 is formed with a recess 104 recessed axially rearward from an axially front end face 102 of the conductor 100. The recess 104 is defined by side surfaces 106, 108, 110 and 112, and an end face 114.

The side surfaces 106 and 108 extend axially rearward from the end face 102 so as to be opposite to each other. The side surface 106 is a flat surface parallel with the side surface 86 of the protrusion 84, and the side surface 108 is a flat surface parallel with the side surface 88 of the protrusion 84.

The side surfaces 110 and 112 extend between the side surfaces 106 and 108, and extend axially rearward from the end face 102 so as to be opposite to each other. The side surface 110 is a flat surface parallel with the side surface 90 of the protrusion 84, and the side surface 112 is a flat surface parallel with the side surface 92 of the protrusion 84. The end face 114 is connected to axially rear edges of the side surfaces 106, 108, 110, and 112, and is a flat surface parallel with the end face 94 of the protrusion 84.

When the conductor 80 and the conductor 100 are connected with each other as illustrated in FIG. 8, the axially rear end of the conductor 80 is fitted into the space 44 of the through-hole 34 located axially rear side of the conductor 80, and the protrusion 84 is fitted into the recess 104.

At this time, the end face 82 and the end face 102, the side surface 86 and the side surface 106, the side surface 88 and the side surface 108, the side surface 90 and the side surface 110, the side surface 92 and the side surface 112, and the end face 94 and the end face 114 come into surface-contact with each other. As a result, the conductors 80 and 100 are connected in the axial direction so as to be conductive with each other.

In this way, in this embodiment, by the axially rear end of the conductor 80 being fitted into the space 44 and by the protrusion 84 being fitted into the recess 104, the conductor 80 and the conductor 100 are connected so as to be conductive with each other. Therefore, a fitting structure between the axially rear end of the conductor 80 and the space 44 and a fitting structure between the protrusion 84 and the recess 104 constitute the connecting structure 81.

Then, the connecting structure 81 includes the side surfaces 86, 88, 90, 92 and the end face 94 that define the protrusion 84; and the side surfaces 106, 108, 110, 112 and the end face 114 that define the recess 104. By this connecting structure 81, two of the rotor segments adjacent to each other in the axial direction are mechanically connected via the conductors 80 and 100.

According to this embodiment, by the conductor 80 engaging the wall surface that defines the through-hole 34, the strength in the radial direction between two of the cores 28 adjacent to each other in the axial direction can be enhanced, and therefore it is possible to prevent these cores 28 from being displaced in the radial direction relative to each other.

In addition, in this embodiment, the side surfaces 86 and 106, the side surfaces 88 and 108, the side surfaces 90 and 110, and the side surfaces 92 and 112, that extends in the axial direction, are in contact with each other. As a result, even when two of the adjacent cores 28 are displaced so as to be separated from each other in the axial direction during the operation of the rotor 10, a disconnection between the conductor 80 and the conductor 100 can be prevented.

Figure 9:
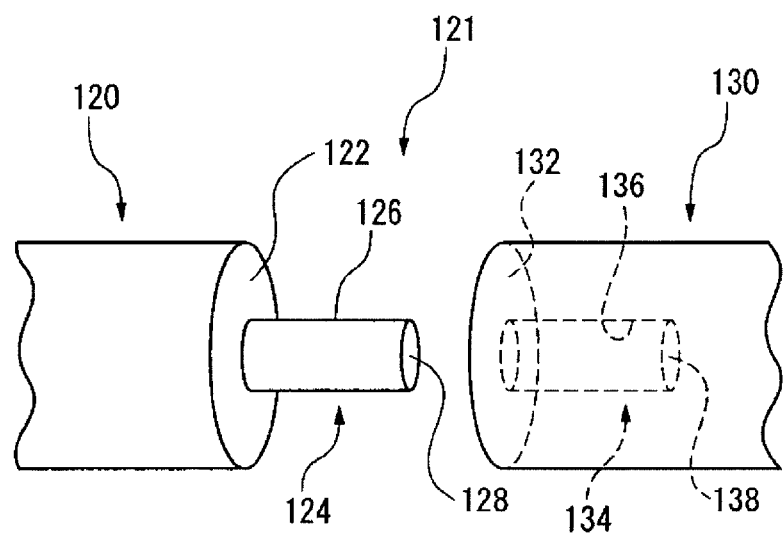
FIG. 9 is an exploded perspective view of a connecting structure according to yet another embodiment.
Figure 10:
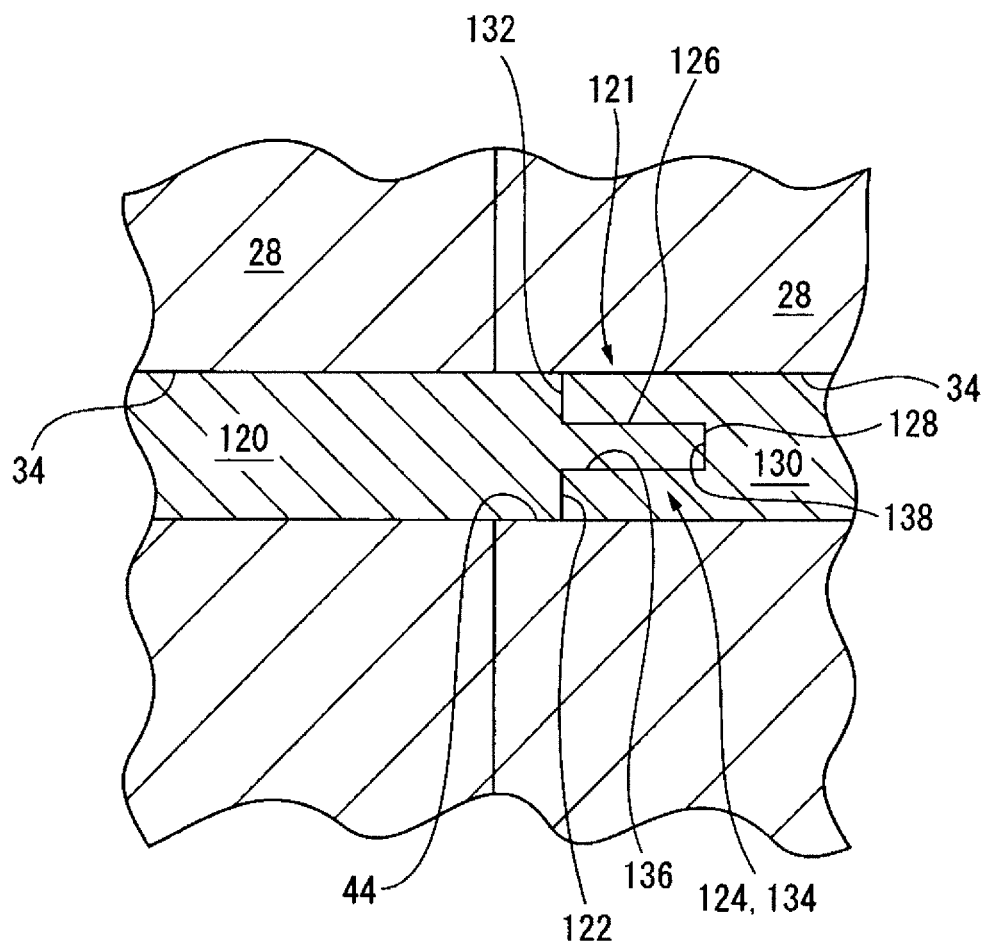
FIG. 10 is a cross-sectional view illustrating a state in which two conductors are connected using the connecting structure illustrated in FIG. 9.

FIG. 9 and FIG. 10 illustrate a connecting structure 121 between a conductor 120 and a conductor 130 disposed axially rear side of the conductor 120. The conductors 120 and 130, and the connecting structure 121 can be applied to the above-described rotor 10.

At an axially rear end of the conductor 120, a protrusion 124 is formed so as to protrude axially rearward from an end face 122. The protrusion 124 has a column-shape, and is defined by a side surface 126 and an end face 128. The side surface 126 is a cylindrical surface extending to be parallel with the axial direction, and faces to the direction orthogonal to the axial direction. The end face 128 is connected to an axially rear edge of the side surface 126, and is a flat surface substantially orthogonal to the axial direction.

On the other hand, the conductor 130 is formed with a recess 134 recessed axially rearward from an axially front end face 132 of the conductor 130. The recess 134 is defined by a side surface 136 and an end face 138. The side surface 136 is a cylindrical surface parallel with the side surface 126 of the protrusion 124. The end face 138 is connected to an axially rear edge of the side surface 136, and is a flat surface parallel with the end face 128 of the protrusion 124.

As illustrated in FIG. 10, when the conductor 120 and the conductor 130 are connected with each other, the axially rear end of the conductor 120 is fitted into the space 44 of the through-hole 34, and the protrusion 124 is fitted into the recess 134. At this time, the side surface 126 and the side surface 136, and the end face 128 and the end face 138 come into surface-contact with each other. As a result, the conductors 120 and 130 are connected in the axial direction so as to be conductive with each other.

Thus, in this embodiment, by the axially rear end of the conductor 120 being fitted into the space 44, and by the protrusion 124 being fitted into the recess 134, the conductor 120 and the conductor 130 are connected so as to be conductive with each other. Therefore, a fitting structure between the axially rear end of the conductor 120 and the space 44 and a fitting structure between the protrusion 124 and the recess 134 constitute the connecting structure 121.

Then, the connecting structure 121 includes the side surface 126 and the end face 128 that define the protrusion 124, and the side surface 136 and the end face 138 that define the recess 134. By this connecting structure 121, two of the rotor segments adjacent to each other in the axial direction are mechanically connected via the conductors 120 and 130.

According to this embodiment, by the conductor 120 engaging the wall surface that defines the through-hole 34, the strength in the radial direction between two of the cores 28 adjacent to each other in the axial direction can be enhanced, and therefore the relative displacement in the radial direction of these cores 28 can be prevented.

Further, in this embodiment, the side surfaces 126 and 136 extending in the axial direction are in contact with each other. Due to this, even when two of the adjacent cores 28 are displaced so as to be separated from each other in the axial direction during the operation of the rotor 10, a disconnection between the conductor 120 and the conductor 130 can be prevented.

Figure 11:
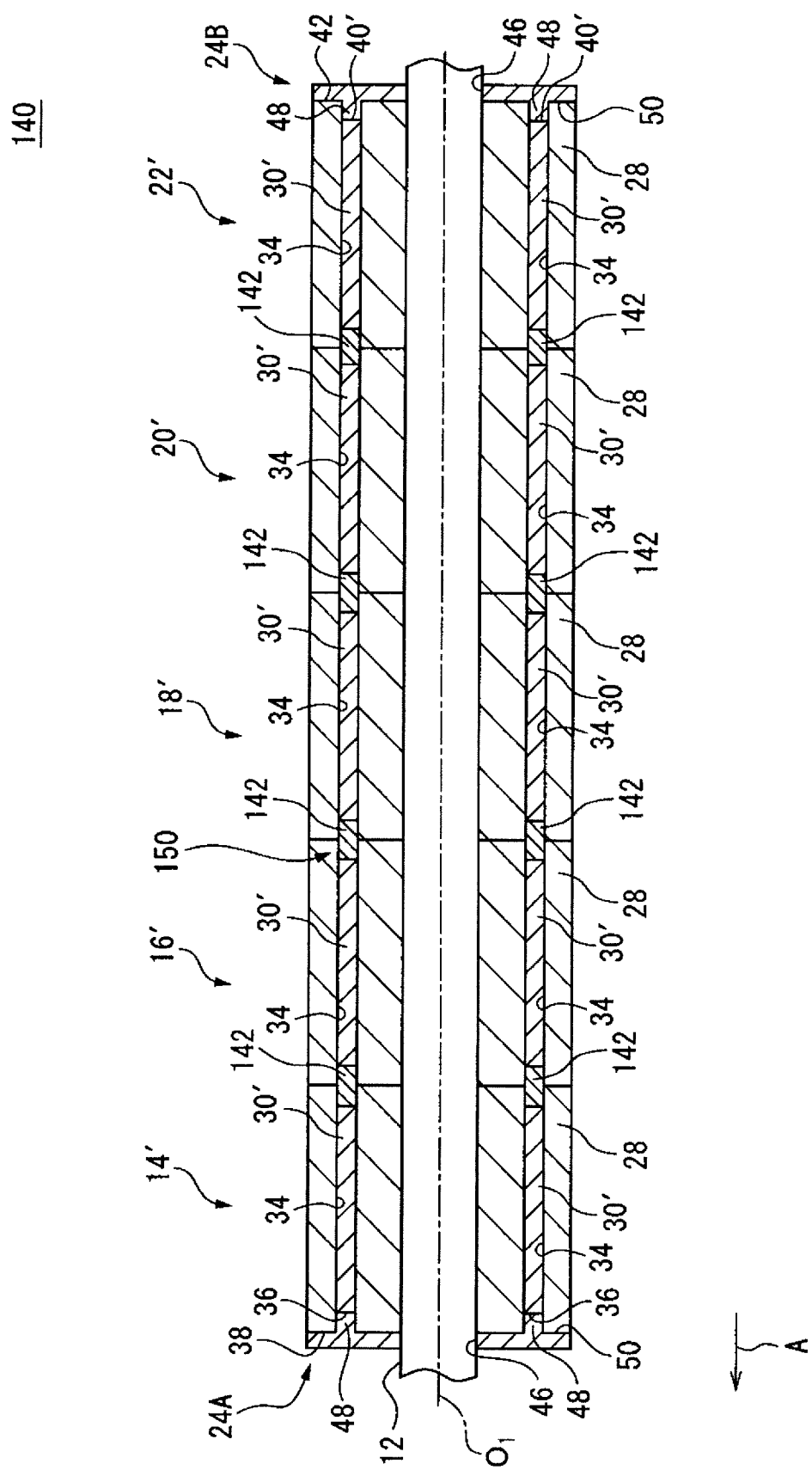
FIG. 11 is a cross-sectional view of a rotor according to another embodiment.

Next, a rotor 140 according to another embodiment is described with reference to FIG. 11 to FIG. 13. As illustrated in FIG. 11, the rotor 140 includes the shaft 12, a plurality of rotor segments 14', 16', 18', 20' and 22', a pair of short-circuit rings 24A and 24B, and a plurality of relay conductors 142. The plurality of rotor segments 14', 16', 18', 20', and 22' are fixed radially outside of the shaft 12, and aligned in the axial direction.

The rotor segments 14', 16', 18', 20', and 22' have the same configuration. The rotor segments 14', 16', 18', 20' and 22' differ from the above-described rotor segments 14, 16, 18, 20, and 22 in conductors 30'.

Figure 12:
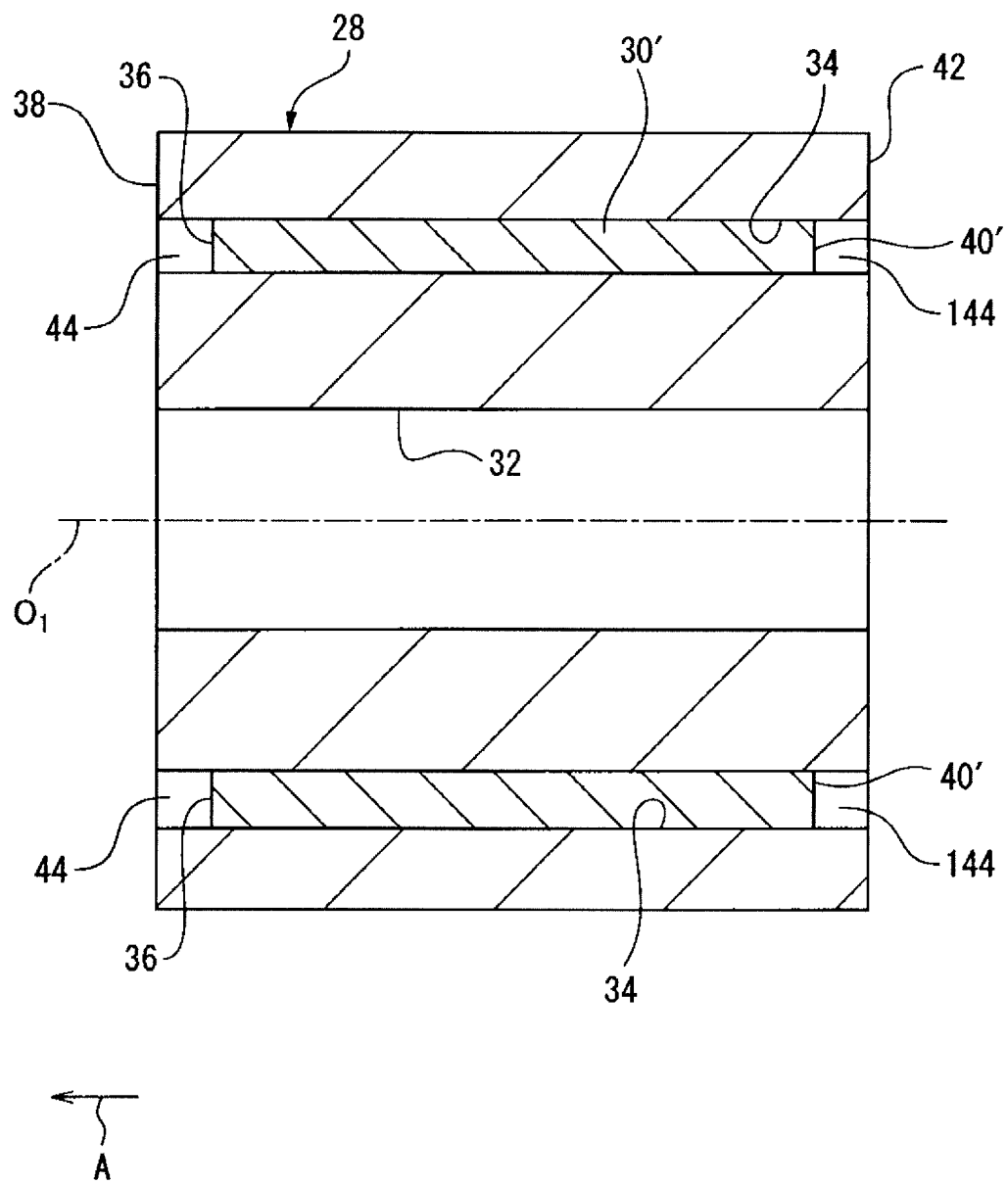
FIG. 12 is a cross-sectional view of a rotor segment illustrated in FIG. 11.

Specifically, as illustrated in FIG. 12, an axially rear end 40' of each conductor 30' of the rotor segments 14', 16', 18', 20' and 22' is disposed so as to be recessed axially frontward from the axially rear end face 42 of the core 28. As a result, a space 144 is formed in an axially rear end of each through-hole 34.

The relay conductor 142 has a conductivity equal to or higher than the conductor 30'. As illustrated in FIG. 11, the relay conductor 142 is disposed between the conductor 30' of one rotor segments 14', 16', 18', or 20', and the conductor 30' of the other rotor segment 16', 18', 20', or 22' adjacent to the one rotor segment on axially rear side.

Specifically, as illustrated in FIG. 13, an axially front end of the relay conductor 142 is fitted into the space 44 formed in the through-hole 34 of the one rotor segment 14', 16', 18', 20'. An axially front end face 146 of the relay conductor 142 is in contact with the axially rear end 40' of the conductor 30' of the one rotor segment 14', 16', 18', 20'.

On the other hand, an axially rear end of the relay conductor 142 is fitted into the space 144 formed in the through-hole 34 of the other rotor segment 16', 18', 20', 22'. An axially rear end face 148 of the relay conductor 142 is in contact with the axially front end 36 of the conductor 30' of the other rotor segment 16', 18', 20', 22'.

Thus, in this embodiment, by the relay conductor 142, the axially front end of which is fitted into the spaces 44, and the axially rear end of which is fitted into the spaces 144, the conductor 30' of the one rotor segments 14', 16', 18', 20' and the conductor 30' of the other rotor segments 16', 18', 20', 22' adjacent to the one rotor segment on axially rear side are connected with each other so as to be conductive with each other.

Therefore, in this embodiment, the relay conductor 142, a fitting structure between the axially front end of the relay conductor 142 and the space 44, and a fitting structure between the axially rear end of the relay conductor 142 and the space 144 constitute the connecting structure 150 that connects two conductors 30' adjacent to each other in the axial direction so as to be conductive with each other.

By this connecting structure 150, the one rotor segment 14', 16', 18', 20' and the other rotor segment 16', 18', 20', 22' adjacent to the one rotor segment on axially rear side are mechanically connected with each other.

Once again, with reference to FIG. 11, the short-circuit rings 24A and 24B have the same configuration as the above-described short-circuit ring 24, and are disposed so as to sandwich the rotor segments 14', 16', 18', 20', and 22' from the both sides in the axial direction.

Specifically, the short-circuit ring 24A is disposed adjacent to the core 28 of the rotor segment 14' on axially front side, such that the axially rear end face 50 of the short-circuit ring 24A is in surface-contact with the axially front end face 38 of the core 28 of the rotor segment 14'. The protrusions 48 of the short-circuit ring 24A are respectively fitted into the spaces 44 of the through-holes 34 of the rotor segment 14', and conductively contact the axially front ends 36 of the conductors 30 of the rotor segment 14'.

On the other hand, the short-circuit ring 24B is disposed adjacent to the core 28 of the rotor segment 22' on axially rear side, such that the axially front end face 50 of the short-circuit ring 24B is in surface-contact with the axially rear end face 42 of the core 28 of the rotor segment 22'.

The protrusions 48 of the short-circuit ring 24B are respectively fitted into the spaces 144 of the through-holes 34 of the rotor segment 22', and conductively contact the axially rear ends 40' of the conductors 30 of the rotor segment 14'. In this way, the conductors 30', the relay conductors 142, and the short-circuit rings 24A and 24B are conductive with each other, and configure a so-called cage-type conductor.

In this embodiment, both axial ends of the relay conductor 142 are respectively fitted into the spaces 44 and 144 of the through-holes 34, and engage the wall surfaces that define the through-holes 34. According to this configuration, since the strength in the radial direction between the cores 28 of the two rotor segments adjacent to each other in the axial direction can be enhanced, the relative displacement in the radial direction of these two cores 28 can be prevented.

Further, in this embodiment, the rotor segments 14', 16', 18', 20', and 22' are aligned in the axial direction such that the two adjacent cores 28 are in surface-contact with each other, and no short-circuit ring is interposed between the two adjacent cores 28.

According to this configuration, an axial length of an assembly of the conductors 30' and the relay conductors 142, which contributes to the generation of the rotational torque, can be increased, thereby the induced current generated in the conductors 30' and the relay conductors 142 can be increased. As a result, it is possible to increase the rotational torque of the rotor 140.

It should be noted that there are many variations of the connecting structure 150 that connects two of the conductors 30' adjacent to each other in the axial direction. Variations of the connecting structure are described below with reference to FIG. 14 to FIG. 15.

Figure 14:
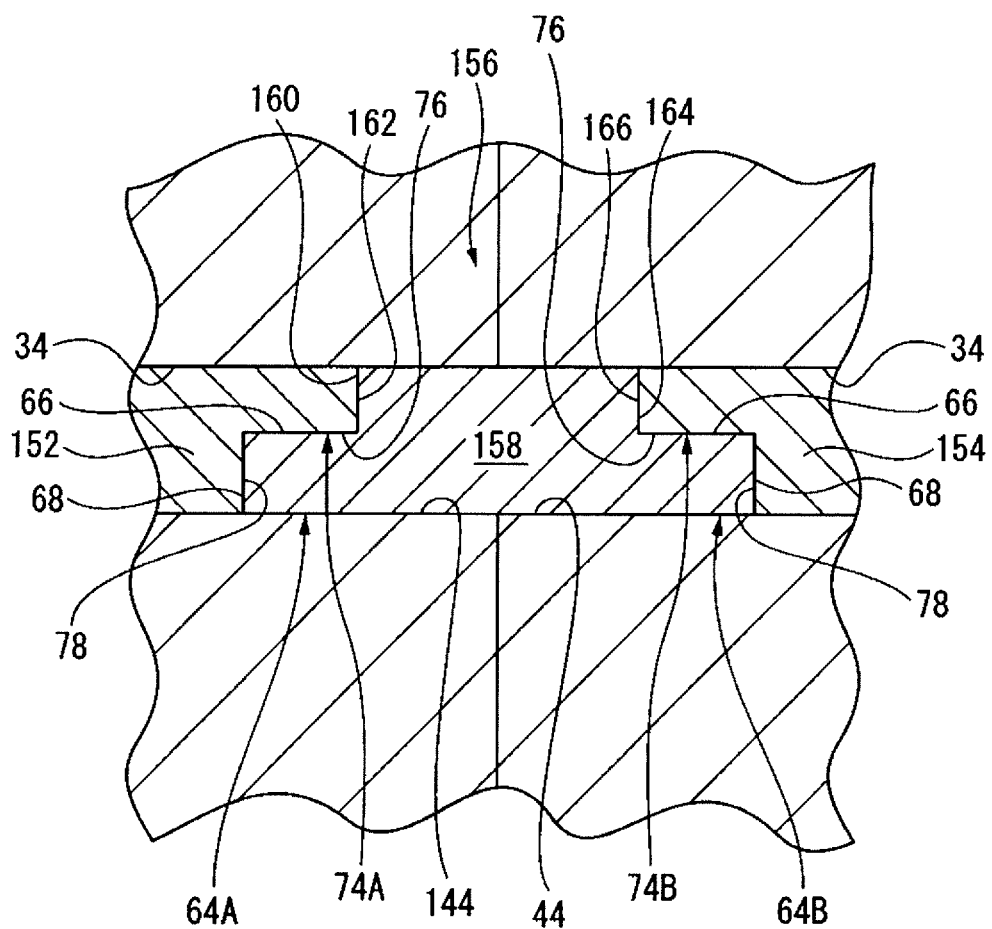
FIG. 14 is an enlarged cross-sectional view of a connecting structure according to yet another embodiment.

FIG. 14 illustrates a connecting structure 156 between a conductor 152 and a conductor 154 disposed axially rear side of the conductor 152. The conductors 152 and 154, and the connecting structure 156 can be applied to the above-described rotor 140.

In this embodiment, a protrusion 64A is formed at an axially front end of a relay conductor 158. The protrusion 64A has the same configuration as the above-described protrusion 64, and is provided so as to protrude axially frontward from an end face 160 of the relay conductor 158.

A protrusion 64B is formed at an axially rear end of the relay conductor 158. The protrusion 64B has the same configuration as the above-described protrusion 64, and is provided so as to protrude axially rearward from an end face 164 of the relay conductor 158 opposite the end face 160.

A recess 74A is formed at an axially rear end of the conductor 152. The recess 74A has the same configuration as the above-described recess 74, and is provided so as to be recessed axially frontward from an axially rear end face 162 of the conductor 152.

A recess 74B is formed at an axially front end of the conductor 154. The recess 74B has the same configuration as the above-described recess 74, and is provided so as to be recessed axially rearward from an axially front end face 166 of the conductor 154.

When the conductors 152 and 154 are connected by the connecting structure 156 as illustrated in FIG. 14, the axially front end of the relay conductor 158 is fitted into the space 144 of the through-hole 34 located axially front side of the relay conductor 158, along with which, the protrusion 64A is fitted into the recess 74A. Further, the axially rear end of the relay conductor 158 is fitted into the space 44 of the through-hole 34 located axially rear side of the relay conductor 158, along with which, the protrusion 64B is fitted into the recess 74B.

At this time, the side surfaces 66 and 76, the end faces 68 and 78, the end faces 160 and 162, and the end faces 164 and 166 come into surface-contact with each other. As a result, the conductors 152 and 154 are conductive with each other via the relay conductor 158. Thus, in this embodiment, by the relay conductor 158, the axially front end of which is fitted into the space 44, and the axially rear end of which is fitted into the spaces 144, by the protrusion 64A and the recess 74A being fitted with each other, and by the protrusion 64B and the recess 74B being fitted with each other, two of the conductors 30' adjacent to each other in the axial direction are connected so as to be conductive with each other.

Therefore, the relay conductors 158, a fitting structure between the axially front end of the relay conductor 158 and the space 44, a fitting structure between the axially rear end of the relay conductor 158 and the space 144, a fitting structure between the protrusion 64A and the recess 74A, and a fitting structure between the protrusion 64B and the recess 74B constitute the connecting structure 156 that connects two of the conductors 30' adjacent to each other in the axial direction so as to be conductive with each other.

According to this embodiment, by each relay conductor 158 engaging the wall surface that defines the through-holes 34, the strength in the radial direction between two of the cores 28 adjacent to each other in the axial direction can be enhanced, and therefore, the relative displacement in the radial direction of the cores 28 can be prevented.

Further, in this embodiment, the side surfaces 66 and 76 extending in the axial direction are in contact with each other. Due to this, even when the two adjacent cores 28 are displaced so as to be separated from each other in the axial direction during the operation of the rotor 140, disconnection between the conductors 152 and 154 can be prevented.

Figure 15:
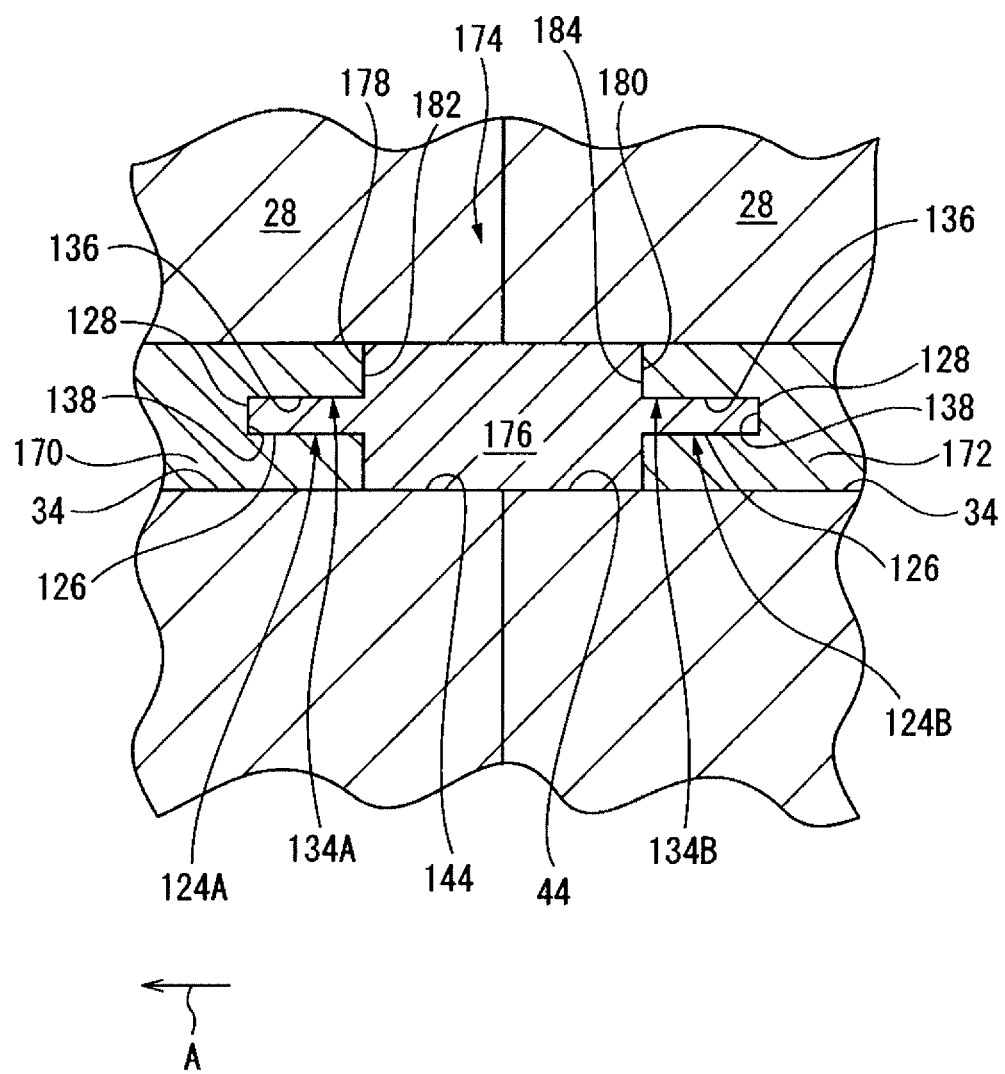
FIG. 15 is an enlarged cross-sectional view of a connecting structure according to yet another embodiment.

FIG. 15 illustrates a connecting structure 174 between a conductor 170 and a conductor 172 disposed axially rear side of the conductor 170. The conductors 170 and 172, and the connecting structure 174 can be applied to the above-described rotor 140.

In this embodiment, a protrusion 124A is formed at an axially front end of a relay conductor 176. The protrusion 124A has the same configuration as the above-described protrusion 124, and is provided so as to protrude axially frontward from an end face 178 of the relay conductor 176.

On the other hand, a protrusion 124B is formed at an axially rear end of the relay conductor 176. The protrusion 124B has the same configuration as the above-described protrusion 124, and is provided so as to protrude axially rearward from an end face 180 of the relay conductor 176 opposite the end face 178.

A recess 134A is formed at an axially rear end of the conductor 170. The recess 134A has the same configuration as the above-described recess 134, and is provided so as to be recessed axially frontward from an axially rear end face 182 of the conductor 170.

On the other hand, a recess 134B is formed at an axially front end of the conductor 172. The recess 134B has the same configuration as the above-described recess 134, and is provided so as to be recessed axially rearward from an axially front end face 184 of the conductor 172.

When the conductors 170 and 172 are connected by the connecting structure 174 as illustrated in FIG. 15, the axially front end of the relay conductor 176 is fitted into the space 144 of the through-hole 34 located axially front side of the relay conductor 176, along with which, the protrusion 124A is fitted into the recess 134A. Further, the axially rear end of the relay conductor 176 is fitted into the space 44 of the through-hole 34 located axially rear side of the relay conductor 176, along with which, the protrusion 124B is fitted into the recess 134B.

At this time, the side surfaces 126 and 136, the end faces 128 and 138, the end faces 178 and 182, and the end faces 180 and 184 come into surface-contact with each other. As a result, the conductors 170 and 172 are conductive with each other via the relay conductor 176.

Thus, in this embodiment, by the relay conductor 176, the axially front end of which is fitted into the space 144, and the axially rear end of which is fitted into the space 44, by the protrusion 124A and the recess 134A being fitted with each other, and by the protrusion 124B and the recess 134B being fitted with each other, two of the conductors 30' adjacent to each other in the axial direction are connected so as to be conductive with each other.

Therefore, the relay conductors 176, a fitting structure between the axially front end of the relay conductor 176 and the space 144, a fitting structure between the axially rear end of the relay conductor 176 and the space 44, a fitting structure between the protrusion 124A and the recess 134A, and a fitting structure between the protrusion 124B and the recess 134B constitute the connecting structure 174 that connects two of the conductors 30' adjacent to each other in the axial direction so as to be conductive with each other.

According to this embodiment, by each relay conductor 176 engaging the wall surface that defines the through-holes 34, the strength in the radial direction between two of the cores 28 adjacent to each other in the axial direction can be enhanced, and therefore the relative displacement in the radial direction of these two cores 28 can be prevented.

Further, in the connecting structure 174 according to this embodiment, the side surfaces 126 and 136 extending in the axial direction are in contact with each other. As a result, even when two of the adjacent cores 28 are displaced so as to be separated from each other in the axial direction during the operation of the rotor 140, disconnection between the conductors 170 and 172 can be prevented.

Note that, in the embodiment illustrated in FIG. 15, the protrusions 84A and 84B, which have the same configuration as the above-described protrusion 84, may be applied in place of the protrusions 124A and 124B, respectively. In this case, the recesses 104A and 104B, which have the same configuration as the above-described recess 104, may be applied in place of the recesses 134A and 134B, respectively.

Further, each of the side surfaces 66, 86, 88, 90, 92, and 126 of the above-described protrusions 64, 64A, 64B, 84, 84A, 84B, 124, 124A, and 124B may be a tapered surface inclined with respect to the axial direction.

Figure 17:
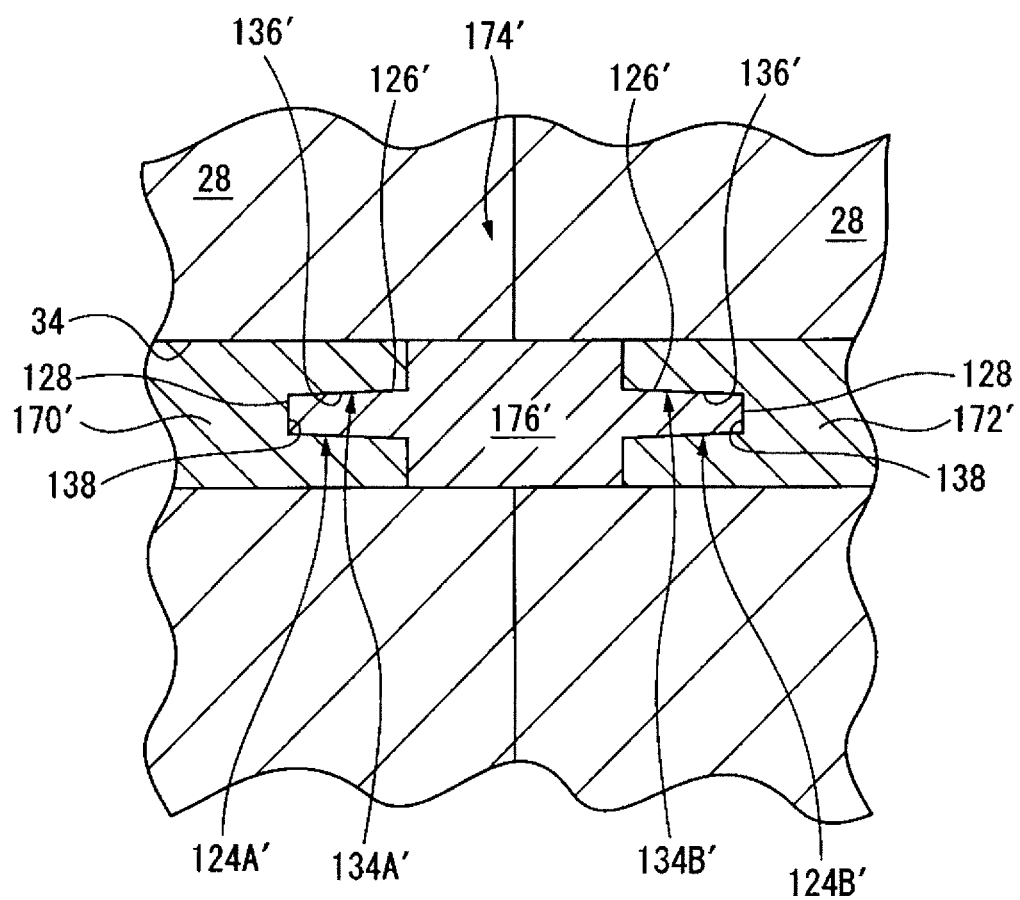
FIG. 17 is an enlarged cross-sectional view of a connecting structure according to yet another embodiment.

Such an embodiment is illustrated in FIG. 16 and FIG. 17. FIG. 16 illustrates a connecting structure 61' that is a modified example of the connecting structure 61 illustrated in FIG. 6. In the connecting structure 61', a side surface 66' that defines a protrusion 64' formed at an axially rear end of a conductor 60' is a tapered surface inclined with respect to the axial direction. Further, a side surface 76' that defines a recess 74' formed at an axially front end of a conductor 70' is a tapered surface parallel with the side surface 66'.

FIG. 17 illustrates a connecting structure 174' that is a modified example of the connecting structure 174 illustrated in FIG. 15. In the connecting structure 174', side surfaces 126' that define protrusions 124A' and 124B' formed at both axial ends of a relay conductor 176' are tapered surfaces inclined with respect to the axial direction.

Further, a side surface 136' that defines a recess 134A' formed in a conductor 170' is a tapered surface parallel with the side surface 126' of the protrusion 124A'. Further, the side surface 136' that defines a recess 134B' formed in a conductor 172' is a tapered surface parallel with the side surface 126' of the protrusion 124B'.

By forming the side surfaces to be the tapered surfaces as illustrated in FIG. 15 and FIG. 17, it is possible to facilitate fitting the protrusion into the recess, a manufacturing operation of the rotor can be made easier.

Note that, the cross-sectional shape of the conductor 30, 30', 60, 60', 70, 70', 80, 100, 120, 130, 152, 154, 170, 170', 172, or 172' is not limited to the circular shape, but may be any shape, such as an oval shape and a polygonal shape. In this case, the through-hole 34 may have a shape which coincides with that of the conductor.

Further, in the embodiment illustrated in FIG. 1, a second short-circuit ring 26 may be applied in place of the short-circuit ring 24. In this case, the axially front end 36 of each of the conductors 30 of the rotor segment 14 is disposed so as to protrude axially frontward from the axially front end face 38 of the core 28 of the rotor segment 14, wherein the front ends 36 are respectively received in the conductor-receiving holes 54 of the second short-circuit ring 26, and conductively contact with the second short-circuit ring 26.

Alternatively, in the embodiment illustrated in FIG. 1, a second short-circuit ring 24 may be applied in place of the short-circuit ring 26. In this case, the axially rear end 40 of each conductor 30 of the rotor segment 22 is disposed so as to be recessed axially frontward from the axially rear end face 42 of the core 28 of the rotor segment 22, wherein the protrusions 48 of the second short-circuit ring 24 are respectively fitted into the through-holes 34 of the rotor segment 22 from axially rear side thereof, and conductively contact the rear ends 40 of the conductors 30.

Further, the rotor 10 or 140 may include two to four of the rotor segments, or six or more of the rotor segments. Furthermore, the rotor 10 or 140 is not limited to the induction motor, but may be any type of electric motor such as a synchronous motor.

While the present disclosure has been described above through the embodiments, the above-described embodiments do not limit the invention according to the claims.

The invention claimed is:

1. A rotor of an electric motor, comprising:
a shaft extending in an axial direction;
a plurality of rotor segments fixed radially outside of the shaft and aligning in the axial direction, each rotor segment including:
   a core having a pair of axial end faces and a through-hole extending between the axial end faces; and
   a conductor disposed in the through-hole, and including a first end in one direction of the axial direction and a second end in the other direction of the axial direction; and
   a connecting structure configured to connect a first conductor of a first rotor segment with a second conductor of a second rotor segment adjacent to the first rotor segment in the other direction of the axial direction so as to be conductive with each other, the second conductor being separate from the first conductor,
wherein a first axial end face of the core of the first rotor segment and a first axial end face of the core of the second rotor segment are in contact with each other, and
wherein the connecting structure mechanically connects the first rotor segment and the second rotor segment with each other such that the first conductor and the second conductor are aligned in the axial direction and that the second end of the first conductor contacts the first end of the second conductor.

2. A rotor of an electric motor, comprising:
a shaft extending in an axial direction;
a plurality of rotor segments fixed radially outside of the shaft and aligning in the axial direction, each rotor segment including:
   a core having a pair of axial end faces and a through-hole extending between the axial end faces; and
   a conductor disposed in the through-hole; and
   a connecting structure configured to connect the conductor of a first rotor segment with the conductor of a second rotor segment adjacent to the first rotor segment in the axial direction so as to be conductive with each other,
wherein a first axial end face of the core of the first rotor segment and a first axial end face of the core of the second rotor segment are in contact with each other,
wherein the connecting structure mechanically connects the first rotor segment and the second rotor segment with each other,
wherein the conductor of the first rotor segment is disposed so as to protrude outward of the core of the first rotor segment on a side facing the conductor of the second rotor segment,
wherein the conductor of the second rotor segment is disposed so as to be recessed inward of the core of the second rotor segment on a side facing the conductor of the first rotor segment, and
wherein the connecting structure includes a structure configured to fit the conductor of the first rotor segment into the through-hole of the second rotor segment so as to contact the conductor of the second rotor segment.

3. The rotor of claim 1, further comprising a pair of short-circuit rings configured to sandwich the plurality of rotor segments from both sides in the axial direction, the pair of short-circuit rings being conductive with the conductors of the plurality of rotor segments,
wherein at least one of the pair of short-circuit rings includes:
   a hole that receives the conductor of the rotor segment adjacent to the short-circuit ring; or
   a protrusion fitted into the through-hole of the rotor segment adjacent to the short-circuit ring so as to contact the conductor of the rotor segment.

* * * * *